Dec. 17, 1963 A. W. MILLWARD 3,114,823
ELECTRICAL HEATER PLATE
Filed July 14, 1961
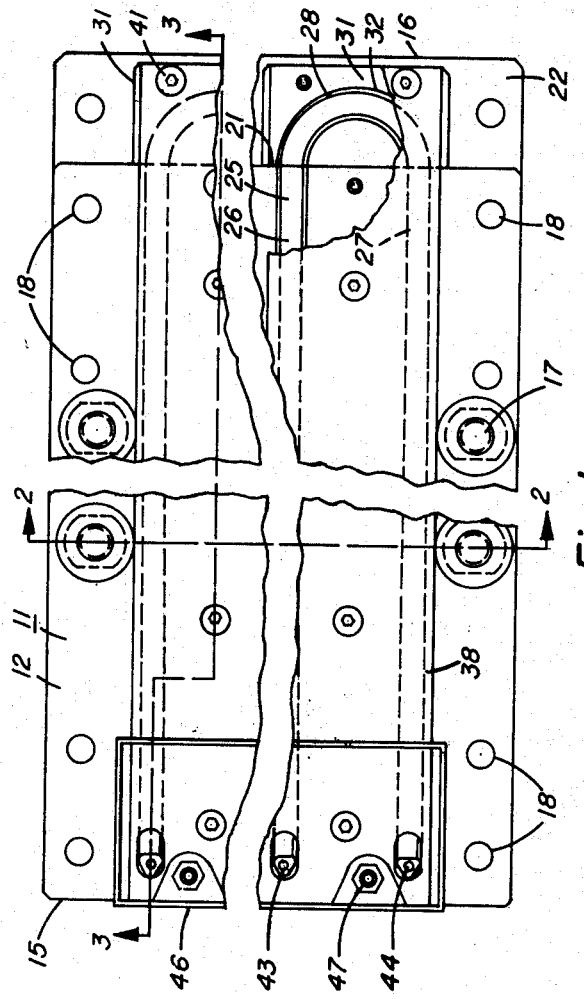
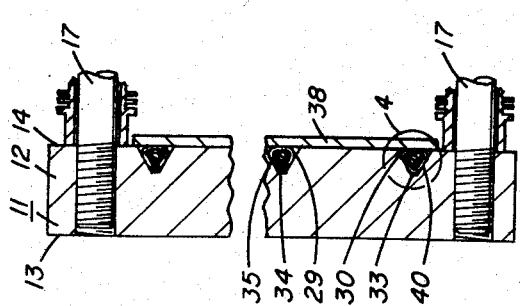
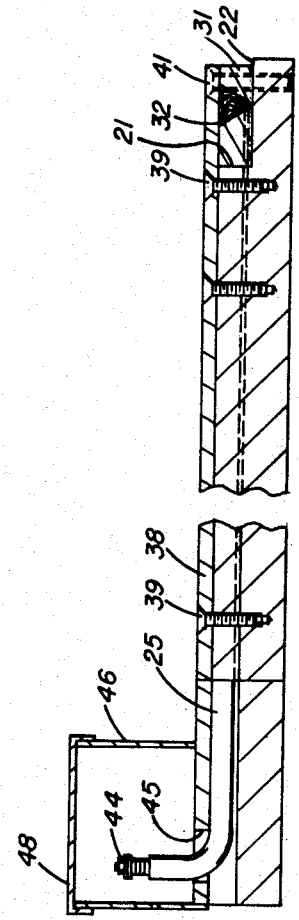
INVENTOR.
ARTHUR W. MILLWARD
BY Woodling, Krost,
Granger and Rust,
attys.

United States Patent Office 3,114,823
Patented Dec. 17, 1963

3,114,823
ELECTRICAL HEATER PLATE
Arthur W. Millward, Cleveland, Ohio, assignor to The National Acme Company, a corporation of Ohio
Filed July 14, 1961, Ser. No. 124,142
5 Claims. (Cl. 219—37)

The invention relates in general to electrical heater plates and more particularly to an electrically heated face plate for use in molding machines and the like, such as shell molding or shell core machines, which require heat to partially cure the shell mold or shell core.

In many types of machines, an electrically heated plate is required to heat articles, and in shell molding or shell core machines in particular, there are two relatively movable face plates on which the mold boxes or core boxes are mounted and which are heated by the heater plates. For economy of electric power and for close regulation of the mold or core temperature, it is desirable to have efficient heat transfer from the electrical heater elements to the mold boxes or core boxes.

Accordingly, an object of the invention is to provide an electrically heated plate usable with molding or core machines which has good heat transfer characteristics.

Another object of the invention is to provide an electrically heated plate which has economy of electrical heater elements and economy of manufacture of the complete heater plate.

Another object of the invention is to provide an electrical heater plate with a combined clamping and heat transfer mechanism to efficiently clamp the heater element to the heater plate and to provide good heat transfer therebetween.

Another object of the invention is to provide an improved mounting and clamping means for an electrical heater element which includes a separate end plate having a curved grooved to engage a curved portion of the heater element.

The invention is general includes a face plate with two longitudinal grooves in one face, an electrical heater element having two legs disposed in the two grooves and having a curved portion joining the two legs, a flat backing plate substantially covers the heater element which has a cross-section generally conforming to that of the grooves to establish a surface contact with the sides of the grooves and the underside of the backing plate. Means is provided for electrical connection to the heater element and there is means securing the backing plate to the face plate and establishing surface contact between the electrical heater element and the sides of the grooves, and between the backing plate and the face plate. Means is also provided including the backing plate for conducting heat from the curved portion of the heater element to the face plate, with this last named means including metallic means having a curved groove therein engaging one side of the heater element.

Other objects and a fuller understanding of this invention may be had by referring to the following description and claims, taken in conjunction with the accompanying drawing, in which:

FIGURE 1 is a plan view of an electrical heater plate incorporating the invention;

FIGURE 2 is a sectional view on line 2—2 of FIGURE 1;

FIGURE 3 is a sectional view on line 3—3 of FIGURE 1; and

FIGURE 4 is an enlarged view of a portion of FIGURE 2, with the backing plate removed.

The figures of the drawing show an electrical heater plate 11 embodying the invention. The heater plate includes, generally, a face plate 12 having a front face 13 and a rear face 14 and first and second opposite edges 15 and 16. The face plate 12 may be mounted by mounting bolts 17 to a machine with which it is used, for example, a shell molding or shell core machine. The electrical heater plate 11 may be used in opposed pairs in such a shell molding or shell core machine and be used to mount core boxes or mold boxes on the front face 13 thereof, such as by the mounting holes 18.

A recessed surface is provided near the second edge 16 and this recessed surface includes a recessed edge 21 and a recessed bottom surface 22. The recessed edge 21 is parallel to the second edge 16 and closely spaced thereto.

The electrical heater plate 11 is provided with a plurality of heaters and each such heater includes an electrical heater element 25. Each heater element includes first and second legs 26 and 27, respectively, and a curved portion 28. The entire heater element 25 is generally U-shaped with substantially parallel legs 26 and 27 and, accordingly, the curved portion 28 is substantially semi-circular.

The face plate 12 in the rear face 14 thereof has first and second longitudinal grooves 29 and 30, respectively, to receive the first and second legs 26 and 27 of the heater element 25. An end plate 31 is provided for each heater and abuts the recessed bottom surface 22 and the recessed edge 21. Each end plate has a curved groove 32 therein and, as shown, this curved groove is substantially semi-circular. The longitudinal grooves 29 and 30 and the curved groove 32 are V-shaped in cross-section with a rounded bottom 33, and these grooves have a pre-determined depth. The depth from the rear face 14 to the recessed bottom surface 22 of the face plate 12 is in excess of this pre-determined depth. The curved groove 28 has the same V-shape and the same pre-determined depth so that it does not cut through the end plate 31.

The electrical heater element 25 also has a corresponding shape relative to the grooves and is shown as being generally triangular in form. This electrical heater element is preferably in the form of a sheathed tubular heater having a sheath 34 and a resistance element 35. The space between is filled with a highly compressed powdered insulation having a minimum of voids and, thus, good heat transfer characteristics from the resistance element 35 to the sheath 34.

A backing plate 38 is a flat elongated metal plate held on by mounting screws 39 to the rear face of the face plate 12. The size of the grooves 29, 30 and 32 is so proportioned relative to the size of the heater element 25 that the backing plate forces the heater element 25 into good surface contact with the sides of the groove as at 40. This backing plate also is drawn up by the screws 39 into good surface contact with the rear face 14 and, of course, has good surface contact with the rear surface of the heater element 25. This tight surface engagement between all parts assures good heat conductivity for good heat transfer characteristics to the face plate 12. Mounting screws 41 pass through the backing plate and through the end plate 31 into the face plate to fasten these three elements together.

Each heater element 25 has first and second terminal ends 43 and 44. These terminal ends are bent at right angles from the respective legs 26 and 27 and pass through apertures 45 in the backing plate 38. The terminal ends 33 and 34 are disposed within a terminal box 46 secured on the rear of the electrical heater plate 11 by screws 47. A cover 48 is provided for the terminal box 46. FIGURE 1 shows this cover 48 removed.

The entire electrical heater plate may be easily and economically constructed. The longitudinal grooves 29 and 30 may be machined quite simply, for example, by a planer, shaper or milling machine. These grooves do not have a depth sufficient to cut into the recessed bottom surface 22, hence, they are straight, longitudinal grooves extending completely from the first edge 15 to the recessed edge 21. This permits their easy manufacture. The end plates 31 are separate rectangular blocks of metal and the semi-circular groove 32 therein may easily be fabricated. One may take two such end plates clamped together and then, as in face plate work on a lathe, cut a circular groove in the two end plates. When the end plates are removed from the machine tool, there will be a semi-circular groove in each end plate. Alternatively, a block of metal twice the size of an end plate 31 may be used and a circular groove cut therein on any suitable machine tool, such as a lathe or boring mill, and then the block of metal cut in half to form two end plates. In this case, the amount of metal wasted when the block is cut in half means that each groove will not be exactly semi-cricular, but in practice, this is so close to semi-circular that the ends of this curved groove will readily meet with the ends of the longitudinal grooves at the recessed edge 21 to form a U-shaped path for the heater element 25. Accordingly, it will be seen that the end plates 31 provide a simple means of establishing the U-shaped path for the heater elements 25, without any complicated machining in the face plate 12. Also, these end plates provide a metallic means for a conductive heat transfer path from the bight of the U-shaped heater element 25 to the face plate 12.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An electrical heater plate comprising, in combination, a face plate, first and second longitudinal grooves of a predetermined depth in one face of said face plate, said face plate having first and second opposite edges near opposite ends of said grooves, an end plate of a thickness greater than said predetermined depth having a semi-circular groove and secured to said face plate near said second edge, an electrical heater element having two legs disposed in said two longitudinal grooves and a curved portion in said semi-circular groove, a flat elongated backing plate substantially covering said electrical heater element, said heater element having a cross-section generally conforming to that of said grooves to establish a surface contact with the sides of said grooves and the underside of said backing plate, means providing electrical connection to said heater element, and means securing said backing plate to said face plate and establishing tight surface contact between said electrical heater element and the sides of said grooves and between said backing plate and said face plate.

2. An electrical heater plate comprising, in combination, a face plate, first and second longitudinal grooves in one face of said face plate, each said groove being V-shaped in cross-section and having a predetermined depth, said face plate having first and second opposite edges near opposite ends of said grooves, an end plate of a thickness greater than said predetermined depth having a semi-circular groove V-shaped in cross-section and secured to said face plate near said second edge, an electrical heater element having two legs disposed in said two longitudinal grooves and a curved portion in said semi-circular groove, a flat elongated backing plate substantially covering said electrical heater element and said end plate, said heater element having a generally triangular cross-section to establish a surface contact with the sides of said V-shaped grooves and the underside of said backing plate, means providing electrical connection to said heater element, and means securing said backing plate to said face plate and establishing tight surface contact between said electrical heater element and the sides of said V-shaped grooves and between said backing plate and said face plate.

3. An electrical heater plate comprising, in combination, a face plate, first and second longitudinal grooves in the rear face of said face plate, each said groove being V-shaped in cross-section and having a rounded bottom of a predetermined depth, said face plate having first and second opposite edges, recessed surface means near said second edge of said rear face defining a recessed edge and a recessed bottom surface and having a depth in excess of the depth of said groove, said first and second grooves extending to said recessed edge, an end plate having a substantially semi-circular groove V-shaped in cross-section secured to said face plate at said recessed bottom surface, an electrical heater element having two legs disposed in said two longitudinal grooves and a curved portion in said semi-circular groove, a flat elongated backing plate substantially covering said electrical heater element and said end plate, said heater element having a generally triangular cross-section to establish a surface contact with the sides of said V-shaped grooves and the underside of said backing plate, means providing electrical connection to said heater element, and means securing said backing plate to said face plate and establishing tight surface contact between said electrical heater element and the sides of said V-shaped grooves and between said backing plate and said face plate.

4. An electrical heater plate comprising, in combination, a face plate, first and second longitudinal and parallel grooves in the rear face of said face plate, each said groove being V-shaped in cross-section and having a rounded bottom of a predetermined depth, said face plate having first and second opposite edges, recessed surface means adjacent said second edge of said rear face defining a recessed edge and a recessed bottom surface and having a depth in excess of the depth of said groove, said first and second grooves extending from said first edge to said recessed edge, an end plate having a semi-circular groove V-shaped in cross-section secured to said face plate at said recessed bottom surface, a U-shaped electrical heater element disposed in said two longitudinal grooves with the bight of the U-shape in said semi-circular groove and with the two ends of said U-shaped element near said first edge, a flat elongated backing plate covering said electrical heater element and said end plate from said first edge to said second edge, said heater element having a generally triangular cross-section to establish a surface contact with the sides of said V-shaped grooves and the underside of said backing plate, means providing electrical connection to said heater element near said first edge, and means securing said backing plate to said face plate and establishing tight surface contact between said electrical heater element and the sides of said V-shaped grooves and between said backing plate and said face plate.

5. In a molding or core machine face plate, the provision of a plurality of electrical heaters for said face plate, each said heater comprising, in combination, first and second longitudinal and parallel grooves in the rear face of said plate, each said groove being V-shaped in cross-section and having a rounded bottom of a predetermined depth, said face plate having first and second opposite edges, recessed surface means near said second edge of said rear face defining a recessed edge and a recessed bottom surface adjacent said second edge and having a depth in excess of the depth of said groove, said first and second grooves extending from said first edge to said recessed edge, an end plate having a semi-circular groove V-shaped in cross-section secured to said face plate at said recessed bottom surface, a U-shaped electrical heater element disposed in said two longitudinal grooves with the bight of the U-shape in said semi-circular groove and with the two ends of said U-shaped element near said first edge, a flat elongated backing plate contacting and covering said electrical heater element and said end plate from said first edge to said second edge, said heater element having a generally triangular cross-section to establish a surface contact with the sides of said V-shaped grooves and the underside of said backing plate, first and second apertures in said backing plate near said first edge to permit lateral ingress and egress of said heater element to said grooves, and bolt means securing said backing plate to said face plate and establishing tight surface contact between said electrical heater element and the sides of said V-shaped grooves and between said backing plate and said face plate.

References Cited in the file of this patent

UNITED STATES PATENTS

| | | |
|---|---|---|
| 1,217,226 | Schussler | Feb. 27, 1917 |
| 1,654,292 | Keene et al. | Dec. 27, 1927 |
| 2,880,301 | Naxon | Mar. 31, 1959 |